United States Patent
Qi et al.

(10) Patent No.: US 7,583,645 B2
(45) Date of Patent: Sep. 1, 2009

(54) ADAPTIVE MAC ARCHITECTURE FOR WIRELESS NETWORKS

(75) Inventors: Emily H. Qi, Portland, OR (US); Ravi Murty, Beaverton, OR (US); Tsung-Yuan Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 10/932,508

(22) Filed: Sep. 1, 2004

(65) Prior Publication Data

US 2006/0045117 A1    Mar. 2, 2006

(51) Int. Cl.
H04Q 7/24    (2006.01)

(52) U.S. Cl. ...................................... 370/338

(58) Field of Classification Search ................. 370/252, 370/335–338, 342–344, 463, 419–420; 455/426.2
See application file for complete search history.

(56) References Cited

U.S. PATENT DOCUMENTS

| | | | |
|---|---|---|---|
| 2005/0041616 A1 | 2/2005 | Ginzburg et al. | |
| 2005/0053037 A1 | 3/2005 | Ginzburg et al. | |
| 2005/0152280 A1* | 7/2005 | Pollin et al. | 370/252 |
| 2005/0169205 A1* | 8/2005 | Grilli et al. | 370/313 |
| 2005/0268181 A1 | 12/2005 | Murty et al. | |
| 2006/0233178 A1* | 10/2006 | Lu et al. | 370/395.21 |
| 2007/0206635 A1* | 9/2007 | Pozhenko et al. | 370/473 |
| 2008/0144493 A1* | 6/2008 | Yeh | 370/230 |

FOREIGN PATENT DOCUMENTS

| | | |
|---|---|---|
| EP | 0998096 A2 | 5/2000 |
| EP | 1043865 A2 | 10/2000 |
| EP | 1521398 A2 | 4/2005 |
| TW | 497341 | 8/2002 |
| TW | 513869 | 12/2002 |
| TW | 548935 | 8/2003 |
| TW | 567696 | 12/2003 |
| WO | WO0169801 A2 | 9/2001 |
| WO | WO0195557 A2 | 12/2001 |
| WO | WO 02/13447 A2 | 2/2002 |
| WO | WO0213429 A1 | 2/2002 |
| WO | WO 02/25856 A2 | 3/2002 |
| WO | WO 2004/002090 A2 | 12/2003 |
| WO | WO2004075559 A1 | 9/2004 |
| WO | WO 2005041516 A2 * | 5/2005 |

OTHER PUBLICATIONS

D. Larson, et al., "An Adaptive Approach to Wireless Network Performance Optimization", Technology @ Intel Magazine, Feb./Mar. 2004, pp. 1-7.
Search Report from related Taiwan Application Serial No. 94126941 (5 pgs.).

* cited by examiner

Primary Examiner—Thai D Hoang

(57) ABSTRACT

Devices and methods for observing characteristics of a wireless communication network environment and adjusting at least two different communication configuration parameters substantially at a same time based on the observed characteristics. The devices and methods may monitor radio resource measurements and initiate adaptive smarts for adjusting communication parameters of various protocol layers as a combination. Various other embodiments and features are also disclosed.

21 Claims, 4 Drawing Sheets

ADAPTIVE MAC ARCHITECTURE FOR WIRELESS NETWORKS

CROSS REFERECE TO RELATED APPLICATIONS

This application claims benefit of priority under 35 U.S.C. § 120 to copending U.S. application Ser. No. 10/839,054 entitled "Method and Apparatus to Provide Adaptive Transmission Parameters for Wireless Networks" filed on May 4, 2004 by Murty et al.

BACKGROUND OF THE INVENTION

Wireless networks are becoming increasingly popular and are being widely deployed across many environments. For example, wireless local area networks (WLANs) are seeing increased use in homes, offices, universities and other public areas. Despite the recent dramatic surge in use, WLAN performance today is far from optimized, thus user experiences may vary due to significant changes which may occur over short periods of time in the environment of the wireless network.

Industry standards, such as the various 802.11x technologies governed by the Institute of Electrical and Electronics Engineers (IEEE), have yet to adequately address efficient wireless network management. Current WLANs use a distributed coordination function (DCF) to access the wireless channel. DCF uses a carrier sense multiple access with collision avoidance (CSMA/CA) technique in which receivers send acknowledgements (ACKs) if they successfully receive a packet, otherwise the transmitter resends the packet.

Accordingly, the performance of DCF heavily depends on channel load and the number of users competing for an access point (AP) and its associated wireless channel. When an AP and its associated wireless channel are overloaded, the throughput per user often decreases which means lower performance for all users, not just for the last few who connected. Up to now, most research into improving performance optimization in wireless environments has focused on adjusting only one parameter in the media access control (MAC) layer at a time. However, since a wireless environment can be plagued with a combination of factors such as interference, weak signal strength packet collisions and other detrimental problems, it would be desirable to monitor various network environment parameters and adjust multiple network configuration parameters at the same time to improve wireless performance.

BRIEF DESCRIPTION OF THE DRAWING

Aspects, features and advantages of the embodiments of the present invention will become apparent from the following description of the invention in reference to the appended drawing in which like numerals denote like elements and in which.

DETAILED DESCRIPTION

While the following detailed description may describe example embodiments of the present invention in relation to air interfaces and architectures for WLANs, the invention is not limited thereto and can be applied to other types of wireless networks or air interfaces where advantages could be obtained. Such air interfaces specifically include, but are not limited to, those associated with wireless wide area networks (WWANs), wireless metropolitan area networks (WMANs), such as wireless broadband solutions colloquially referred to as wireless to the max (WiMAX) air interfaces, wireless personal area networks (WPANs) and the like.

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, mobile stations, base stations, APs, routers, gateways, bridges, repeaters and hubs. Further, the radio systems within the scope of the invention may include cellular radiotelephone systems, satellite systems, personal communication systems (PCS), two-way radio systems, two-way pagers, personal computers (PC) and related peripherals, personal digital assistants (PDAs), personal computing accessories and all existing and future arising systems which may be related in nature and to which the principles of the inventive embodiments could be suitably applied.

Figure 1:
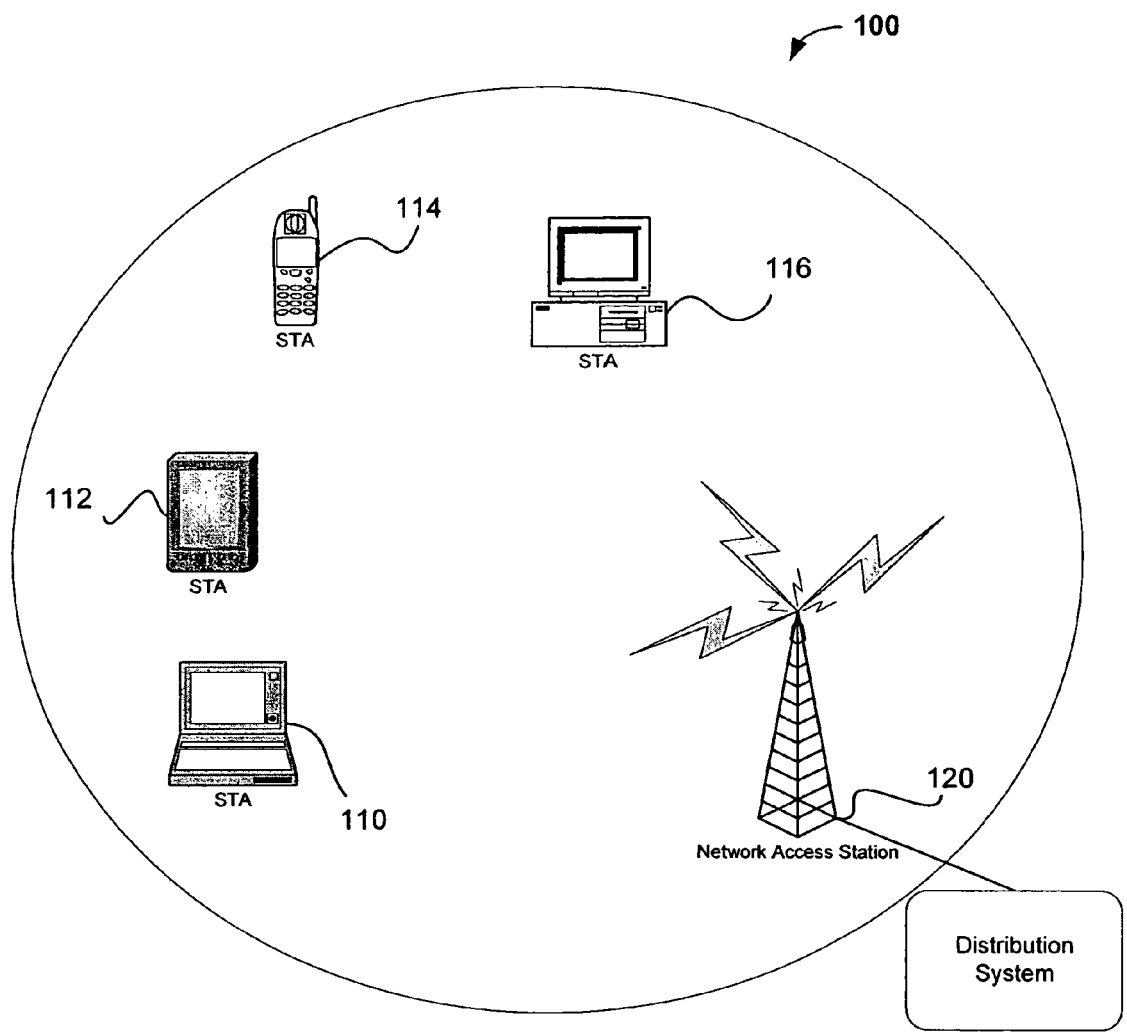
FIG. 1 is a block diagram of a wireless network according to one example embodiment of the present invention.

Referring to FIG. 1, the inventive embodiments described herein may be utilized in a wireless network 100 including one or more mobile stations 110-116 and one or more network access stations 120. In one example implementation, mobile stations 110-116 and network station 120 communicate with one another using WLAN protocols in conformance with one or more of the IEEE 802.11x standards for WLAN (e.g., 802.11a, b, g or n), although the embodiments of the invention are not limited in this respect.

Any of mobile stations 110-116 and/or network access station 120 (in WLAN embodiments referred to respectively as STAs and APs) may include an adaptive MAC architecture that allows the STA and/or AP to analyze the characteristics of the wireless environment and enable the station to adapt intelligently to the dynamic environment. In certain embodiments, the adaptive MAC architecture, because of the functionalities the MAC layer and its position, may be configured to readily provide adjustments to different protocol layers and/or communication configuration parameters simultaneously or consecutively in order to optimize performance of wireless network 100. As used herein, adjusting more than one communication configuration parameter "substantially at the same time," "consecutively," "simultaneously" and/or "substantially simultaneously" means that for the next transmission from a wireless network device, two or more communication configuration parameters are altered from their previous state.

The communication configuration parameter adjustments for different protocol layers may relate to the adjustments to parameters in the various Open Systems Interconnection (OSI) reference model framework for communicating between systems, although the inventive embodiments are not limited in this respect. By way of example only, adjustments to parameters may be made for the physical layer, data link layer, network layer, transport layer, session layer, presentation layer, and/or application layer, combination of layers and/or sub layers specified by various standards (e.g., the MAC layer is an IEEE specification for the lower half of the data link layer) may also be made although the inventive embodiments are not limited in this respect.

As used herein communication configuration parameter means any value or value that may affect communications for wireless communications and which may be dynamically altered to assist in optimizing performance of a wireless network. Specific examples of parameters which may be adjusted in the various inventive embodiments relating to WLAN are discussed below although the embodiments of the invention are not limited in this respect.

For the physical (PHY) layer, adaptive modulation and/or adaptive transmit power may be adjusted to improve performance of the physical link. Adaptive modulation, for example, may include changing the modulation technique or scheme (e.g., binary phase shift keying (BPSK), complementary code keying (CCK), orthogonal frequency division multiplexing (OFDM) and the like) to improve performance. In architectures with multiple antennas for multiple input multiple output (MIMO) communications, adjustment to parameters may include, for example, adapting the beam forming algorithms to improve performance. Transmit power may be adapted based on the interference or location of STAs from APs. Such adaptations may be made in one or more automatic transmit power control (ATPC) algorithms.

For the MAC layer adjustments may be made for access point selection to avoid overloaded APs, adaptive fragmentation size, adaptive data rate, adaptive request-to-send (RTS) clear-to-send (CTS) threshold, adaptive collision avoidance, adaptive power management, dynamic channel allocation and spectral reuse may be adjusted to improve performance of the data link layer. Example fragmentation size and data rate adaptations are discussed in greater detail in U.S. application Ser. No. 10/839,054, from which this application claims benefit of priority.

The RTS/CTS threshold, which specifies the use of RTS/CTS based on the data packet size, may be adjusted depending on the network environment. Adaptive collision avoidance may relate to adapting carrier sense algorithms to ignore non-802.11 devices transmitting energy in the network environment. Adaptive power management may relate to adjustment of power saving techniques used by certain MAC architectures for extending battery life of mobile devices. Dynamic channel allocation may refer to the changing the channel (for example, changing from the default channel 6) to a new channel to avoid interference or reduce overloading a channel. Adjustments for spectral reuse may refer to dynamic frequency allocations for WLAN devices, for example, to repeat frequencies utilized by surrounding but non-adjacent network entities.

For traditional transport and network layers, such as the transmission control protocol (TCP) layer, user datagram protocol (UDP) layer and/or Internet protocol (IP) layer, end-to-end protocols and congestion control may be adjusted to improve network performance. Traditional transport protocols work well in wired networks because they use techniques to overcome congestion problems in the network. In the case of wireless networks, packet loss is primarily due to transmission errors and handoffs. TCP interprets this as congestion and applies traditional congestion control schemes like "slow-start" to overcome these problems making the situation worse and reducing overall throughput. With information about the physical layer and the environment, the transport and network layer can make smarter decisions, for example, wireless networks may provide a mechanism to slow down (or "back off") packets sent to the MAC layer when a number of packet collisions are detected.

For the application layer, adjustments can be made to influence an application for mobility-aware multimedia application. One example of this would be a mobility-aware application that adapts to changes in battery power remaining on the mobile system to balance application quality and battery life. By way of example, a virtual private network (VPN) application may be adjusted to account for interruptions or interference resulting from a wireless environment.

While individual adjustment of each one of the foregoing example communication configuration parameters may or may not be known, the coordinated and dynamic adjustment of two or more of these parameters at the same time or consecutively based on the network environment characteristics to optimize network performance has not been previously suggested or achieved. Algorithms for coordinating dynamic adjustment of these types of parameters are referred to herein as "smarts" or "adaptive smarts."

Figure 2:
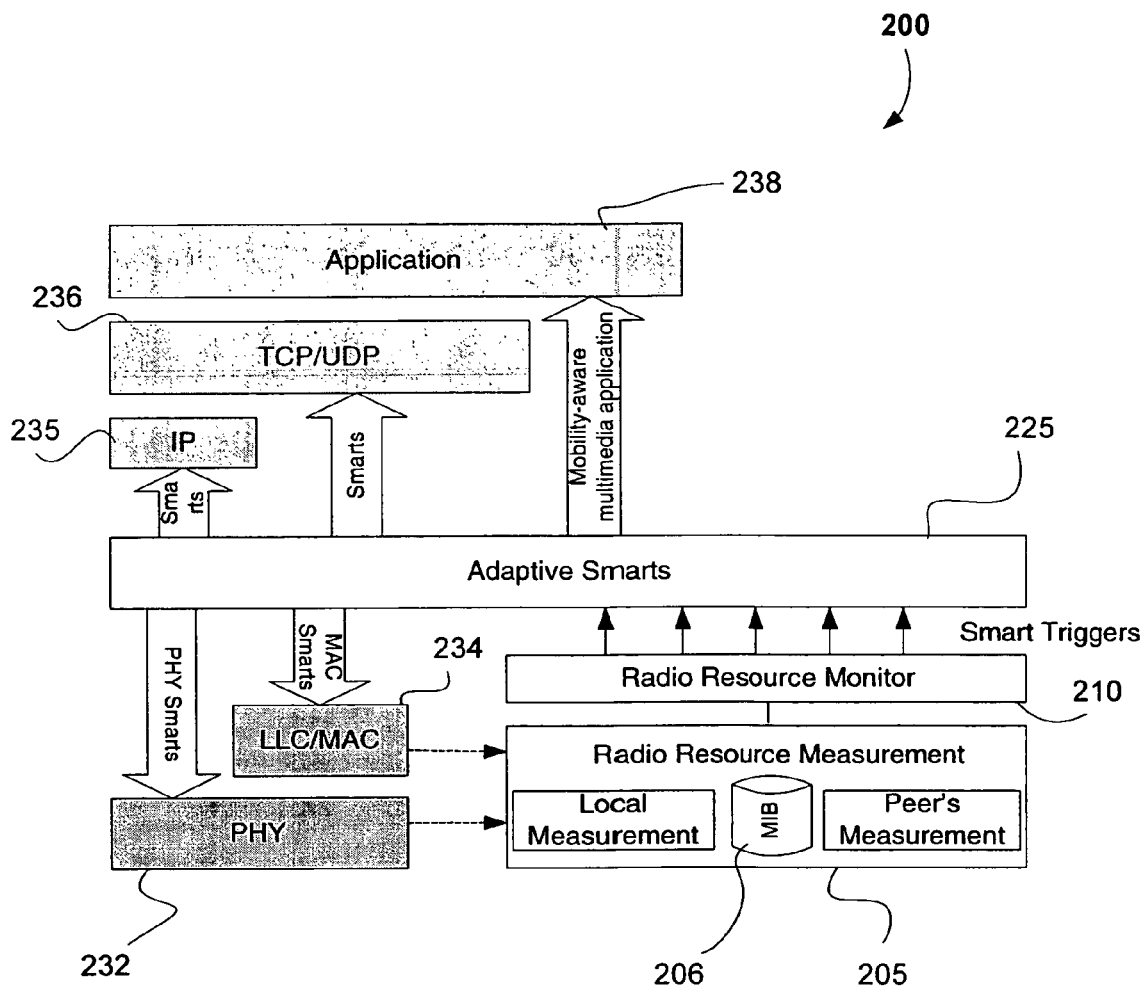
FIG. 2 is a functional block diagram showing an example adaptive architecture according to one embodiment of the present invention.

Turning to FIG. 2, a block diagram showing example architecture 200 for coordinating the adjustment of two or more communication configuration parameters may generally include a radio resource measurement portion 205, a radio resource monitor portion 210 and adaptive smarts 225. Adaptive smarts 225 may work in conjunction with the various protocol layer interfaces 232-238 to adjust respective communication configuration parameters.

Radio resource measurement portion 205 may function to collect radio resource measurement data and/or wireless network information from the PHY and MAC layers 232, 234 and may store the data or information in an internal or external memory 206. In certain embodiments, radio resource measurement portion 205 also may collect and/or exchange data and information from/with other network devices. Radio resource measurement portion may be implemented with any hardware component or combination of components and/or software/firmware to perform these functions.

Radio resource monitor 210 may function to monitor the measurement data and/or information from measurement portion 205 and initiate adaptive smarts 225 based on one or more smart triggers. Smart triggers are a set of thresholds which, when met, may activate one or more adaptive smarts 205 to adjust a combination of communication configuration parameters based on the characteristics of the network environment. Radio resource monitor 210 may be any hardware component or combination of components and/or software/firmware to perform these functions. In physical implementation, monitor 210 may also be combined with measurement portion 205 and/or adaptive smarts 225 if desired.

Adaptive smarts 225 may include a variety of algorithms (e.g., PHY smarts, MAC smarts, TCP/UDP smarts, IP smarts, application smarts, etc. and/or combinations thereof) corresponding to the respective protocol layers 232-238. Each smart 225 may select and/or adjust a set (e.g., 2 or more) of communication configuration parameters to optimize the overall performance of the wireless device when triggered by monitor 210. Adaptive smarts may be implemented as any hardware component or combination of components and/or software/firmware to suitably perform these functions.

Accordingly, a mobile station, network access station, network interface card, network adaptor or other device including architecture 200 may adapt multiple communication configuration parameters simultaneously and/or consecutively. It should be recognized however that there may be differences in architecture 200 for implementation within an AP or other devices. For example, an AP may not require adaptive smarts for the network, transport or application layers 235-238. Many hardware and/or firmware configurations may be possible and the inventive embodiments are not limited to any particular design implementation.

Figure 3:
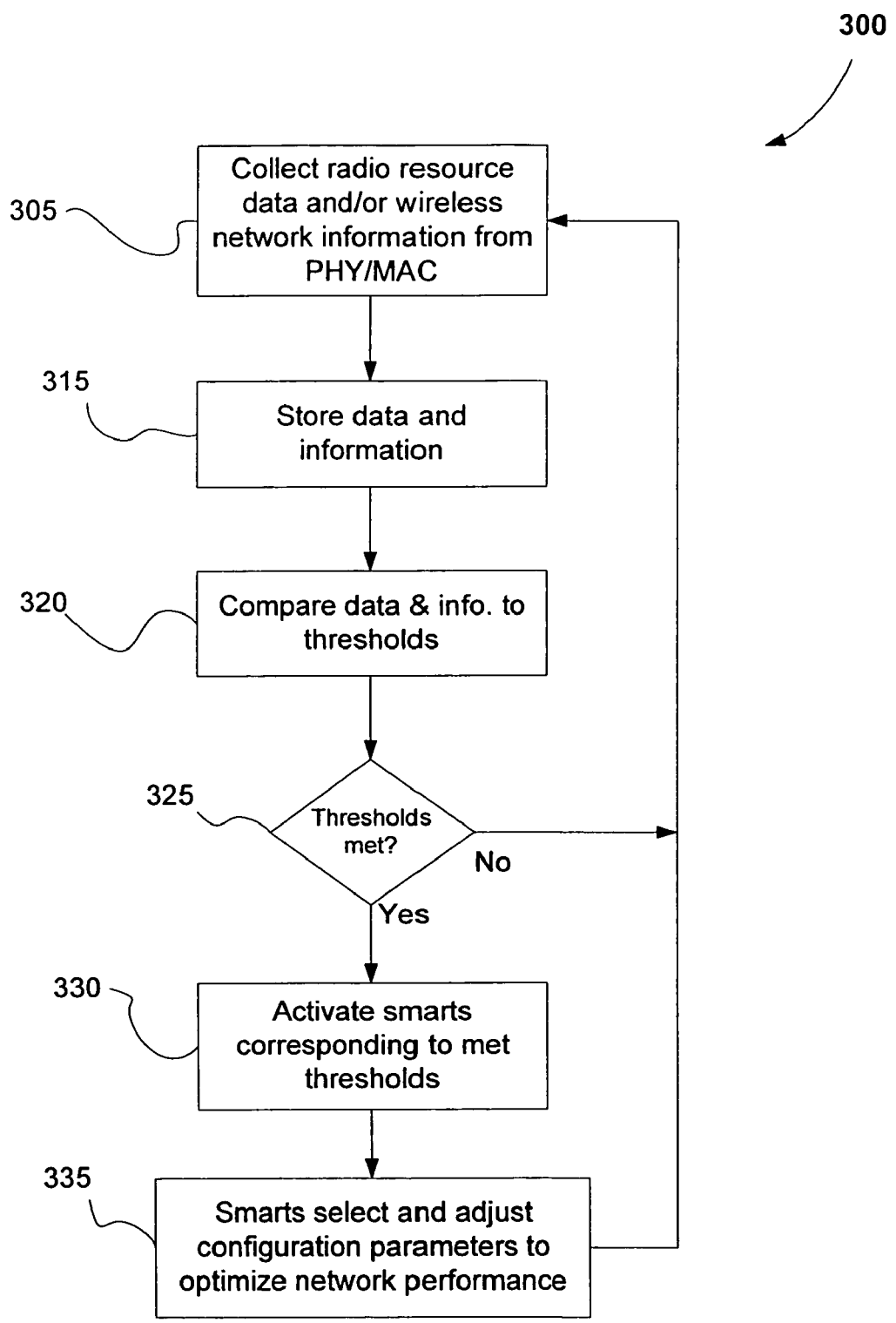
FIG. 3 is a flow diagram showing a method for adapting multiple communication configuration parameters according to one embodiment of the present invention.

Turning to FIG. 3, a method 300 for communicating in a wireless network may generally include (i) observing characteristics of the wireless communication network environment; and (ii) adjusting at least two different communication configuration parameters substantially at a same time based on the observed characteristics.

In one example WLAN implementation, observing characteristics of the wireless environment may include collecting 305 radio resource data from the MAC and/or PHY. The radio resource data may be used to analyze characteristics (e.g., signal-to-noise ratio (SNR) or other characteristics), and may include various types of measurements and/or reports including for example, beacon report, channel load, noise histogram, hidden node report, medium sensing time histogram, peer STA statistics, received channel power indicator (RCPI) or other radio characteristics. Wireless network information may also be collected 305 to assist in further characterization of the network environment. Such network information may include, for example, information from an AP channel report (e.g., channel band, channel list, list of potential AP channels, etc.), or site report (e.g., roaming candidate APs, basic service set identifier (BSSID), BSSID match status, etc).

The collected data and/or information may be stored 315 if desired (e.g., management information base (MIB) 206; FIG. 2) and compared 320 with a plurality of thresholds (e.g., smart triggers) for determining whether adjustments to communication configuration parameters should be made. If one or more of the thresholds are met 325 one or more algorithms (e.g. smarts) associated with the met threshold may be activated 330. The activated algorithms may then select and adjust 335 the two or more communication configuration parameters for optimizing the wireless network performance.

According to one aspect of an inventive embodiment, configuration parameters may be associated with the PHY layer such as modulation adaptation or transmit power control adaptation. In another aspect, configuration parameters may be associated with the MAC layer for example, for AP selection adaptation, fragmentation size adaptation, data rate adaptation, RTS/CTS threshold adaptation, collision avoidance adaptation, power management adaptation, dynamic channel allocation or spectral reuse. In other embodiments, communication configuration parameters may be associated with the network and/or transport protocol layers and may include parameters for end-to-end protocol adaptation or congestion control adaptation. In yet further embodiments, communication configuration parameters may be associated with the application layer to influence an application for mobility awareness. Any combination of configuration parameters for various protocol layers may be adjusted to optimize performance of the wireless network.

In certain embodiments, data and/or information for analyzing the wireless network environment may be at least partially provided by a peer network device such as user station.

Figure 4:
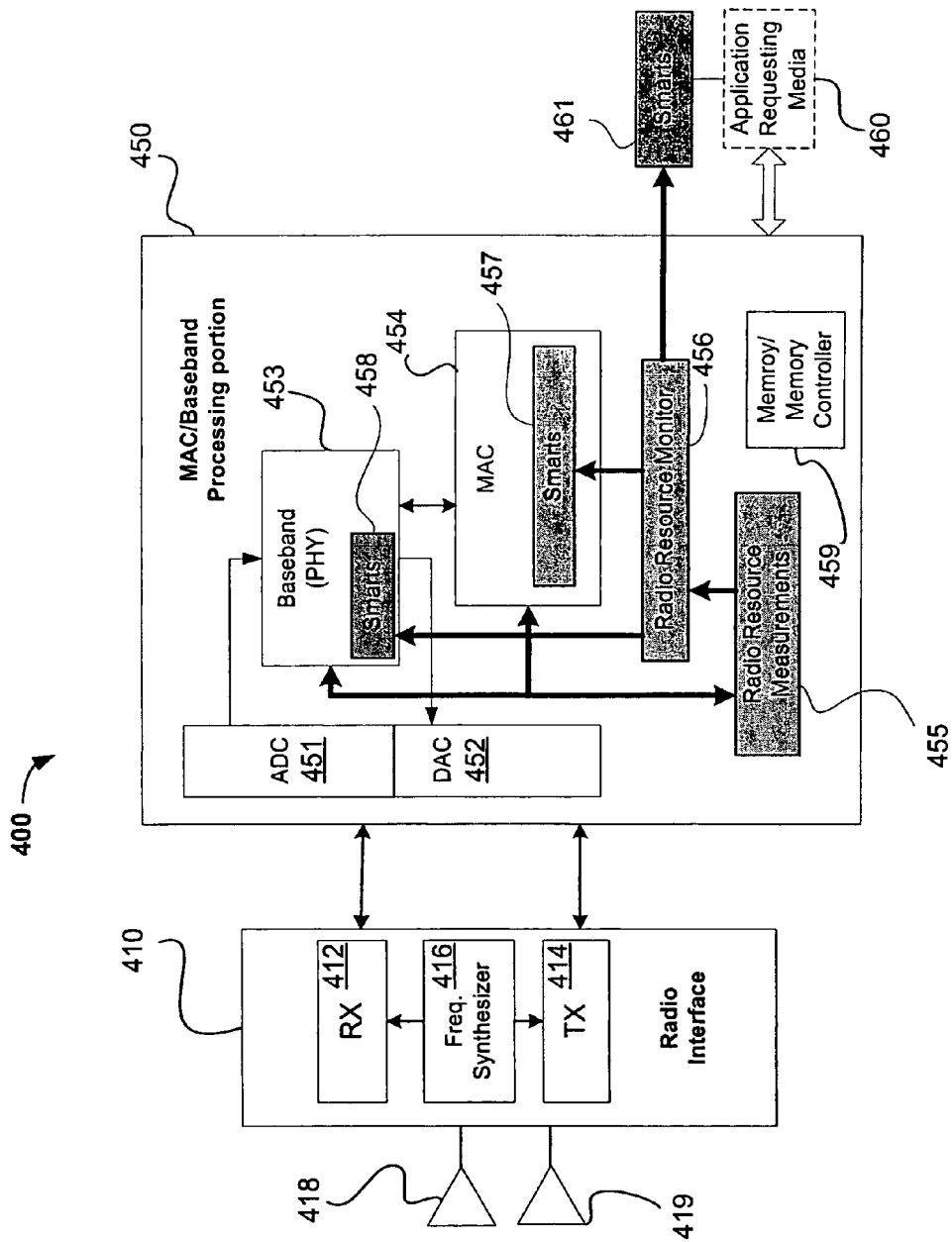
FIG. 4 is a functional block diagram of an example embodiment for a wireless device adapted to perform one or more of the methods of the present invention.

Turning to FIG. 4, a wireless network device 400 according to one embodiment may include a host processing circuit 450 and optionally a radio frequency (RF) interface 410.

Host processing circuit 450 may be any circuit, component or combination of circuits and/or components and/or machine readable code adapted to perform one or more of the methods described herein. In certain embodiments, circuit 450 may include hardware, software and/or firmware components for PHY layer and MAC layer processing of respective receive/transmit signals and may include, for example, a medium access controller 454 a baseband processing portion 453 and/or other components/circuits configured to, at least in part, analyze network environment characteristics and adjust communication configuration parameters based on the network environment as described herein.

To that end, processing circuit 450 may include, or interface with, a radio resource measurement portion 455, a radio resource monitor 456 and algorithms ("smarts") 457, 458, 461 for adjusting various communication configuration parameters. Device 400 preferably includes smarts for adjusting configuration parameters for various protocol layers, for example, MAC/network/transport smarts 457, PHY smarts 458 and/or application smarts 461 although the inventive embodiments are in no way limited to this example.

Device 450 may further include, or interface with, additional components/circuits as desired. For example device 450 may include an analog-to-digital converter (DAC) 451, a digital-to-analog converter (DAC) 452, memory and/or memory controller 459 and or applications 460. While shown separately, smarts 457, 458 and 461 or any other elements of device 400 may be combined into a single element or circuit or further divided as desired.

RF interface 410 may be any component or combination of components adapted to send and receive signals. Preferably, RF interface 410 is adapted to send and receive spread spectrum or OFDM modulated signals, although the embodiments are not limited to any particular modulation scheme or air interface. RF interface may include a receiver 412, a transmitter 414 and a frequency synthesizer 416. Interface 410 may also include bias controls, oscillator(s) and/or one or more antennas 418, 419 if desired. Various RF interface designs and their operation are known in the art and the description thereof is therefore omitted.

Device 400 may be a wireless device such as a cell phone, personal digital assistant, computer, personal entertainment device, wireless router, access point, base station or other equipment and/or wireless network interface or adaptor therefore. Accordingly, the functions and/or specific configurations of device 400 could be varied as suitably desired.

The components and features of device 400 may be implemented using any combination of discrete circuitry, application specific integrated circuits (ASICs), logic gates and/or single chip architectures. Further, the features of device 400 may be implemented using microcontrollers, programmable logic arrays and/or microprocessors or any combination of the foregoing where suitably appropriate.

It should be appreciated that device 400 shown in the block diagram of FIG. 4 is only one functionally descriptive example of many potential implementations. Accordingly, division, omission or inclusion of block functions depicted in the accompanying figures does not infer that the hardware components, circuits, software and/or elements for implementing these functions would necessarily be combined, divided, omitted, or included in embodiments of the present invention.

Embodiments of the present invention may be implemented using single input single output (SISO) systems. However, certain alternative implementations may use multiple input multiple output (MIMO), single input multiple output (SIMO) or multiple input single output (MISO) architectures having multiple antennas (e.g., 418, 419; FIG. 4).

Unless contrary to physical possibility, the inventors envision the methods described herein: (i) may be performed in any sequence and/or in any combination; and (ii) the components of respective embodiments may be combined in any manner.

Although there have been described example embodiments of this novel invention, many variations and modifications are possible without departing from the scope of the invention. Accordingly the inventive embodiments are not limited by the specific disclosure above, but rather should be limited only by the scope of the appended claims and their legal equivalents.

The invention claimed is:

1. A method of communicating comprising:
   observing characteristics of a wireless communication network environment; and
   adjusting at least two different communication configuration parameters substantially at a same time based on the observed characteristics;
   wherein one or more of the at least two different communication configuration parameters are associated with a media access control (MAC) layer and is selected from a group consisting of configuration parameters for access point (AP) selection, fragmentation size adaptation, data rate adaptation, request-to-send (RTS) clear-to-send (CTS) threshold adaptation, collision avoidance adaptation, power management adaptation, dynamic channel allocation and spectral reuse.

2. The method of claim 1 wherein one or more of the at least two different communication configuration parameters are associated with a physical (PHY) layer and is selected from a group consisting of configuration parameters for modulation adaptation and transmit power control adaptation.

3. The method of claim 1 wherein one or more of the at least two different communication configuration parameters are associated with at least one of network or transport layers and is selected from a group consisting of configuration parameters for end-to-end protocol adaptation or congestion control adaptation.

4. The method of claim 3 wherein the at least one of network or transport layers comprise a transmit control protocol (TCP) user datagram protocol (UDP) Internet protocol (IP) layer.

5. The method of claim 1 wherein one of the at least two different communication configuration parameters is associated with an application layer to influence an application program for mobility awareness.

6. The method of claim 1 wherein observing characteristics of a wireless communication environment comprises collecting at least one of radio resource measurement data or wireless network information from a PHY or MAC layer and comparing the collected data or information with a plurality of predetermined thresholds.

7. The method of claim 6 wherein if one of the plurality of predetermined thresholds is met, a set of communication configuration parameters corresponding to the met threshold is adjusted.

8. The method of claim 5 wherein the collected data or information comprises data or information at least partially provided by a peer network device.

9. The method of claim 1 wherein the wireless communication network environment comprises a wireless local area network (WLAN) environment.

10. A device for wireless communication, the device comprising:
    a processing circuit configured to adjust at least two different communication configuration parameters substantially at a same time based on one or more observed characteristics of a wireless network environment;
    wherein the at least two different communication configuration parameters are selected from a group consisting of parameters for modulation adaptation, transmit power control adaptation, access point (AP) selection adaptation, fragmentation size adaptation, data rate adaptation, request-to--send (RTS) clear-to-send (CTS) threshold adaptation, collision avoidance adaptation, power management adaptation, dynamic channel allocation, spectral reuse, and either end-to-end protocol adaptation or congestion control adaptation.

11. The device of claim 10 wherein the at least two different communication configuration parameters are respectively associated with different protocol layers.

12. The device of claim 11 wherein the different protocol layers comprise two or more selected from a group consisting of a physical (PHY) layer, a media access control (MAC) layer, a network layer, a transport layer or an application layer.

13. The device of claim 10 further comprising:
    a radio frequency (RF) interface communicatively coupled to the processing circuit.

14. The device of claim 10 wherein the device comprises at least a portion of a mobile station.

15. The device of claim 10 wherein the device comprises at least a portion of a network access station.

16. The device of claim 10 wherein the device comprises a network interface card (NIC).

17. The device of claim 10 wherein the device comprises a wireless local area network (WLAN) device.

18. The device of claim 10 wherein the processing circuit is further configured to collect radio resource measurement data and compare the collected data with a plurality of thresholds to determine which communication configuration parameters to adjust.

19. A system comprising:
    a processing circuit configured to adjust at least two different communication configuration parameters substantially at a same time based on observed characteristics of a wireless network environment; and
    a radio frequency (RF) interface communicatively coupled to the processing circuit, the RF interface adapted to transmit or receive data using orthogonal frequency division multiplexing (OFDM);
    wherein the at least two different communication configuration parameters are selected from a group consisting of parameters for modulation adaptation, transmit power control adaptation, access point (AP) selection adaptation, fragmentation size adaptation, data rate adaptation, request-to-send (RTS) clear-to-send (CTS) threshold adaptation, collision avoidance adaptation, power management adaptation, dynamic channel allocation, spectral reuse, and either end-to-end protocol adaptation or congestion control adaptation.

20. The system of claim 19 wherein the at least two different communication configuration parameters are respectively associated with different protocol layers.

21. The system of claim 20 wherein the different protocol layers comprise at least two selected from a group consisting of a physical (PHY) layer, a media access control (MAC) layer, a transmit control protocol (TCP) user datagram protocol (UDP) Internet protocol (IP) layer or an application layer.

* * * * *

UNITED STATES PATENT AND TRADEMARK OFFICE
CERTIFICATE OF CORRECTION

PATENT NO. : 7,583,645 B2  Page 1 of 1
APPLICATION NO. : 10/932508
DATED : September 1, 2009
INVENTOR(S) : Qi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1168 days.

Signed and Sealed this

Fourteenth Day of September, 2010

David J. Kappos
*Director of the United States Patent and Trademark Office*